US010523976B2

(12) United States Patent
Hemmati et al.

(10) Patent No.: US 10,523,976 B2
(45) Date of Patent: Dec. 31, 2019

(54) WEARABLE CAMERAS

(71) Applicant: Facebook, Inc., Menlo Park, CA (US)

(72) Inventors: Hamid Hemmati, Encino, CA (US); Shauhwa Cuan, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/865,487

(22) Filed: Jan. 9, 2018

(65) Prior Publication Data
US 2019/0215544 A1 Jul. 11, 2019

(51) Int. Cl.
H04N 5/232 (2006.01)
H04N 21/234 (2011.01)
H04N 5/225 (2006.01)
G06Q 50/00 (2012.01)
H04M 1/02 (2006.01)
H04N 7/14 (2006.01)

(52) U.S. Cl.
CPC ....... *H04N 21/23424* (2013.01); *G06Q 50/01* (2013.01); *H04M 1/0264* (2013.01); *H04N 5/2251* (2013.01); *H04N 5/23251* (2013.01); *H04N 2007/145* (2013.01)

(58) Field of Classification Search
CPC .......................... H04N 5/232; H04N 5/23238
USPC ...................... 348/211.99, 211.2, 211.11, 376
See application file for complete search history.

(56) References Cited

U.S. PATENT DOCUMENTS

| 9,793,941 | B1* | 10/2017 | Hirsch | H04B 1/3888 |
| 2006/0038917 | A1* | 2/2006 | Funato | H04N 5/2251 348/376 |
| 2012/0169883 | A1* | 7/2012 | Chang | H04N 7/181 348/159 |
| 2015/0309582 | A1* | 10/2015 | Gupta | G06F 3/011 345/156 |
| 2015/0365582 | A1* | 12/2015 | Eramian | H04N 5/23206 348/159 |
| 2016/0088222 | A1* | 3/2016 | Jenny | H04N 5/23238 348/36 |
| 2016/0094773 | A1* | 3/2016 | Maciuca | H04N 5/23206 348/207.11 |
| 2016/0127641 | A1* | 5/2016 | Gove | G06T 1/0007 348/143 |
| 2016/0212337 | A1* | 7/2016 | Sagas | H04N 5/222 |
| 2016/0313798 | A1* | 10/2016 | Connor | G06F 3/017 |
| 2017/0060251 | A1* | 3/2017 | Choi | G06F 3/017 |
| 2017/0269697 | A1* | 9/2017 | Vaughn | G06F 3/017 |

FOREIGN PATENT DOCUMENTS

CN          204131598 U *  1/2015  ............. H04N 5/225

* cited by examiner

Primary Examiner — Anthony J Daniels
(74) Attorney, Agent, or Firm — Artegis Law Group, LLP

(57) ABSTRACT

In one embodiment, a method includes accessing multiple temporally synchronized video streams from multiple cameras operated by a first user. At least one of the cameras is a wireless camera worn on the first user's hand. The video streams are stitched together for presentation to one or more second users. The video streams as stitched together are provided for presentation to one or more second users.

23 Claims, 8 Drawing Sheets

US 10,523,976 B2

WEARABLE CAMERAS

TECHNICAL FIELD

This disclosure generally relates to wearable cameras.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a hand-worn video camera is integrated into a network environment and its video-capture contents may be stitched together with other videos on the network environment for creating stitched together videos that may be shared across an online social network. In the network environment, one or more video stream(s) from respective camera(s) may be synchronized and collected, or otherwise accessed, by a computing device or computing system (such as a social-networking system). The camera(s) may be operated by a user and may be wireless and worn on the user's fingers or hands. More specifically, the wireless camera(s) may be worn on the user's fingertip(s) or worn as a ring (or rings) on the user's finger(s). The video streams may be stitched together by a mobile phone or other suitable device of the user. Other cameras operated by the user may be integrated into the mobile phone or other suitable device of the user.

The stitched together video streams may be broadcast live to the users or made accessible to users in any suitable manner. For example, the users may be members of an online social network, such as FACEBOOK, and they may be connected to each other within the online social network. Users may then access the stitched together video streams through the online social network.

The user may wear a camera on a finger or other part of the user's right hand and another camera on a finger or other part of the user's left hand. The cameras may, but need not necessarily, be pointed in different directions or otherwise capture different, possibly non-overlapping, fields of view (FOVs) while they are recording.

A camera worn on the user's hand may, but need not necessarily, be configured to be controlled by movement of the camera resulting from a hand gesture or other hand movement of the user. For example, a particular hand gesture (e.g. a waving motion) may turn the camera on or off. Another hand gesture (e.g. a flicking motion of the camera) may cause the camera to start recording. Another hand gesture (e.g. a sudden upward or downward motion of the hand centered at the wrist) may cause the camera to stop recording. Another hand gesture (e.g. a twirling motion) may cause a live broadcast to start. Another hand gesture may cause a live broadcast from the camera to stop. Other movement patterns of the camera resulting from hand gestures may indicate operational control inputs, such as a camera zoom function or for controlling a presentation of advertisements.

The above-described methods related to integrating a hand-worn video camera into a network environment, and combining its video capture contents with other videos on the network environment to create stitched together videos that may be share across an online social network may further be implemented in one or more computer-readable non-transitory storage media embodying software or in a computing system configured to execute the methods.

The embodiments disclosed herein are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
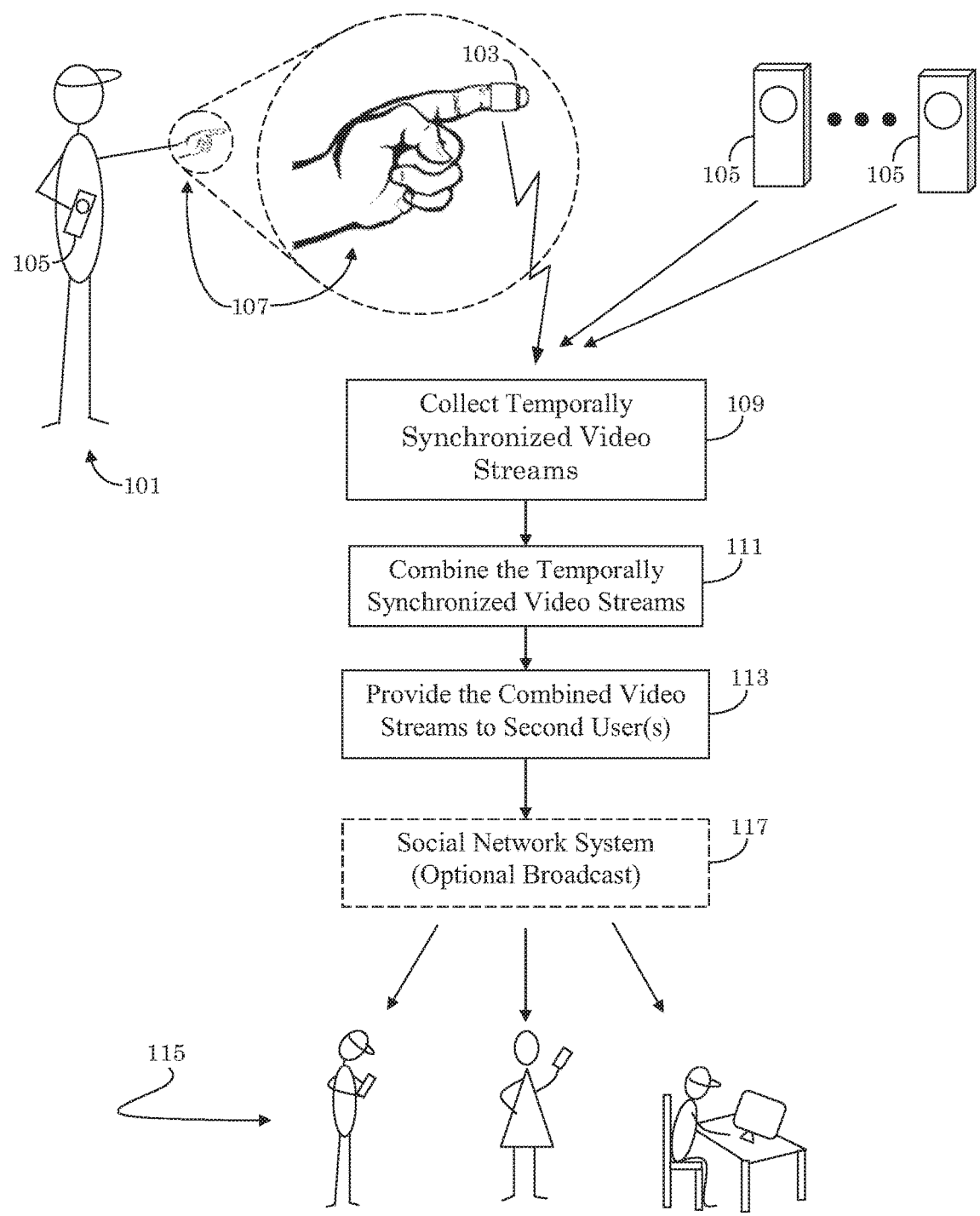
FIG. 1 illustrates an example hand-worn camera.

With reference to FIG. 1, in particular embodiments, a user 101 may operate a video camera 103 that is wireless and configured to be worn on a hand 107 of user 101. For example, camera 103 may be worn on a fingertip or worn as a ring on a finger of hand 107 of user 101. In particular embodiments, user 101 may also wear another camera 103 on another hand 107 of user 101. In particular embodiments, camera 103 may be worn on a wrist of user 101 and have a form factor to be worn on the wrist of user 101. Herein, reference to a camera 103 worn on a user's hand encompasses a camera 103 worn on a user's wrist, and vice versa, where appropriate. One or more other cameras 105 may be hand-held cameras, integrated into multi-function devices such as mobile phones, under direct or remote control of user 101. Camera 103 may include a warning light (such as for example a flashing, blinking, or circling light) other suitable indicator to notify the subject(s) of a recording by camera 103 that camera 103 is recording. In particular embodiments, camera 103 may be used to read Quick Response (QR) or similar codes.

Cameras 103 or 105 may capture video while pointed in different directions and have a different FOVs. Depending on where they are pointed, cameras 103 or 105 may have the same FOV, partially overlapping FOVs, or non-overlapping FOVs. In addition or as an alternative, user 101 may wear one camera 103 on one hand 107 of user 101 and another camera 103 on the other hand 107 of user 101. Depending on where they are pointed, cameras 103 may have the same FOV, partially overlapping FOVs, or non-overlapping FOVs. The FOVs of different cameras 103 or 105 may transition from overlapping to non-overlapping as the cameras are moved by user 101.

As illustrated by block 109, video streams (or video data) from cameras 103 or 105 are collected and synchronized. This may be achieved by cameras 103 or 105 communicating wirelessly with each other and temporally synchronizing an internal clock or counter, which may be used to timestamp captured video. Optionally, by wirelessly communicating with each other, cameras 103 or 105 may further synchronize the capturing of video data and share video data among themselves.

In particular embodiments, captured videos may be stored for later synchronization, which may be achieved by use of the captured videos' respective timestamps. That is, cameras 103 or 105 may internally store captured video or transmit captured video to an external storage location for later processing. For example, if a camera 103 is wirelessly linked to, or otherwise paired with, a camera 105, then video captured by camera 103 may be streamed for storage to camera 105 (or vice versa). Camera 105 may store and process the received video stream, or store the received video stream for later access and processing by an auxiliary data processing device or convey the received video stream to an auxiliary storage location, such as a network data store. Alternatively, camera 103 or 105 may individually transmit its respectively captured video data to a designated auxiliary storage location, such as a network storage location, which may be part of a social-networking system.

After collecting or otherwise accessing the temporally synchronized video streams, block 111 stitches together the video streams, which may include application of various image-processing techniques. Block 111 may define video-display attributes that define a stitched-together video for presentation. When a stitched-together video is provided to a recipient (e.g. other users 115) for viewing, the video-display attributes and video streams and may be provided so that the recipient may utilize the display attributes to construct the stitched-together view from the provided video streams. Alternatively, when a stitched-together video is provided to a recipient for viewing, a new video stream of the stitched-together video may be generated and provided to the recipient for viewing, with the new video stream being constructed by use of the video-display attributes.

The temporally synchronized video streams may be stitched together in many ways including but not limited to the examples described below, individually or in any suitable combination. In particular embodiments, the video-display attributes may define a split-screen view that divides a screen into multiple viewing regions of specific shape, size, and location and further selects which video streams to display in which viewing regions.

When stitching together synchronized video streams, the video-display attributes may further define video selection controls for a user 115 so that user 115 may actively switch, in real-time, between or among different video streams at corresponding points in time. User 115 may switch between views of a plurality of synchronized video streams at temporally corresponding image frames. If cameras 103 or 105 have different FOVs, user 115 may alter viewing angles and view an event from different perspectives.

Video streams from different cameras 103 or 105 having at least partially overlapping FOVs may be stitched together to construct a composite video stream with a composite FOV by using various techniques. For example, image stitching may be use to combine image data (such as individual video frames) from different cameras having overlapping FOVs. Alternatively, image-correspondence techniques, such as feature-point correspondence, may be used to identify corresponding parts of image data from different cameras 103 or 105. The identified image correspondence may then be used to identify the overlapping portion of two FOVs, and camera viewing angles may be determined from gyroscopes, accelerometers, or similar technologies in or associated with cameras 103 or 105, which may then be used to establish a basic calibration for cameras 103 or 105. Once camera calibration is established, their respective video streams may be more quickly stitched together at their overlapping FOV. To address camera movement (which may be common), this basic calibration method may be repeated at regular intervals along synchronized video streams.

In block 113, the stitched-together video streams from block 111 are provided to other users 115 for viewing. Optionally, the stitched-together video streams may be provided directly to other users 115. Alternatively, users 101 and 115 may be members of an online social network (as defined more fully below) and user 101 may connect to other users 115 within the online social network. In this case, other users 115 may access the video streams as stitched together for presentation through the online social network, at block 117. If desired, the video streams as stitched together for presentation may be provided in the form of a broadcast to select other users 115.

Additionally, a stitched-together video stream may be assigned a social-graph affinity coefficient (explained below) or privacy index (explained below) to control which other users 115 are provided access to the stitched-together video stream. In particular embodiments, a user 115 whose personal social-graph affinity coefficient or privacy index is at or above a pre-determined social-graph affinity coefficient or privacy index associated the stitched-together video stream may be given access to the-stitched together video stream. A user 115 whose personal social-graph affinity coefficient or privacy index is below the pre-determined social-graph affinity coefficient or privacy index associated the stitched-together video stream may be denied access to the-stitched together video stream.

In particular embodiments, a camera 103 may be controlled by manual switches, electrodes, or hand gestures. In the case of hand gestures, control may be determined by movement of camera 103 in predefined patterns resulting from camera 103 being worn on the hand. In particular embodiments, camera 103 may be available instantly, to avoid missing precious moments. In particular embodiments, camera 103 may facilitate capturing spontaneous moments, as camera 103 may be available instantly as opposed to a camera 105

Figure 2A:
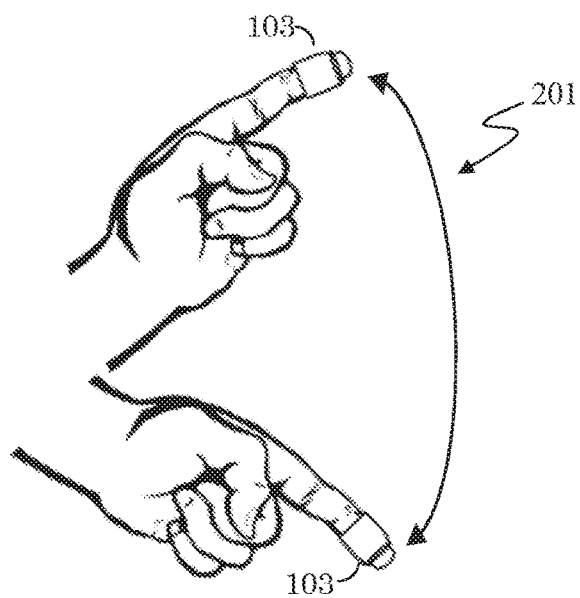
FIGS. 2A and 2B illustrates example hand gestures to control an example camera worn on a fingertip.
Figure 2B:
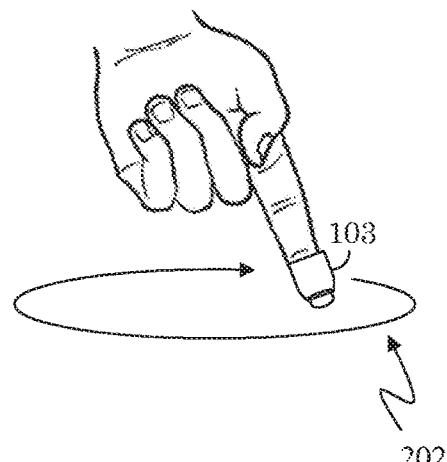

FIGS. 2A and 2B illustrate example hand gestures to control an example camera 103 worn on a fingertip. FIG. 2A illustrates a finger-wagging hand gesture 201. Camera 103 may respond with a predefined function upon recognizing that it is being moved in pattern consistent with gesture 201.

For example, camera 103 may respond by turning on or off, initiating or ceasing a video-recording operation, initiating or ceasing a broadcast function, activating a camera zoom function, controlling a presentation of advertisements, providing an input to an advertisement (e.g. like/dislike), etc. FIG. 2B illustrates a twirling hand gesture 202. Camera 103 may respond to recognizing that it is being moved in accordance with gesture 202 by executing another predefined function or predefined sequence of functions. For example, camera 103 may respond by turning on, connecting to an online social-networking system, and initiating video recording. Although particular gestures controlling particular functions or sequences of functions of a particular camera are described and illustrated, this disclosure contemplates any suitable gestures controlling any suitable functions or sequences of functions of any suitable cameras.

Figure 3A:
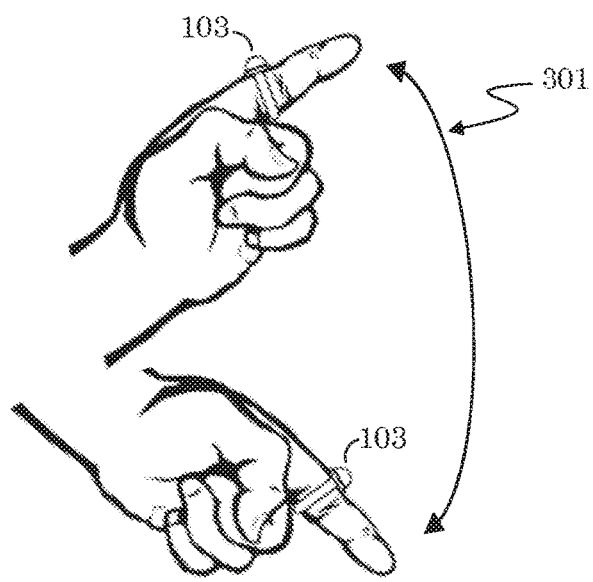
FIGS. 3A and 3B illustrate example hand gestures to control an example camera worn on a ring on a finger.
Figure 3B:
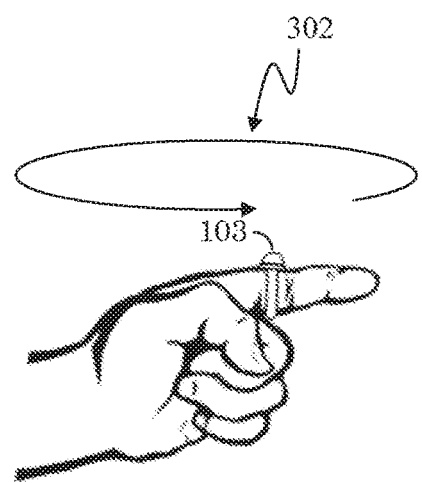

FIGS. 3A and 3B illustrate example hand gestures to control an example camera 103 worn as a ring. FIG. 3A illustrates a finger-wagging hand gesture 301. Camera 103 may respond with a predefined function upon recognizing that it is being moved in pattern consistent with gesture 301. For example, camera 103 may respond by turning on or off, initiating or ceasing a video-recording operation, initiating or ceasing a broadcast function, activating a camera zoom function, controlling a presentation of advertisements, providing an input to an advertisement (e.g. like/dislike), etc. FIG. 3B illustrates a twirling hand gesture 302. Camera 103 may respond to recognizing that it is being moved in accordance with gesture 302 by executing another predefined function or predefined sequence of functions. For example, camera 103 may respond by turning on, connecting to an online social-networking system, and initiating video recording. Although particular gestures controlling particular functions or sequences of functions of a particular camera are described and illustrated, this disclosure contemplates any suitable gestures controlling any suitable functions or sequences of functions of any suitable cameras.

In particular embodiments, camera 103 distinguishes directions in which it is pointed. For example, camera 103 may differentiate between an upward-pointed twirling hand gesture from a downward-pointed twirling hand gesture. An upward-pointed twirling hand gesture may be interpreted as a traditional "wrap it up" gesture, and camera 103 may respond by ceasing a currently active video-recording function. Other examples of hand gestures include a hand waving motion, a finger- or hand-flicking motion, or sudden (or quick) upward or downward pivot motion of a hand centered at a wrist.

In particular embodiments, a camera 103 may include a haptic feedback mechanism that is actuated in response to recognizing a particular hand gesture as an input signal (e.g. control input). For example, camera 103 may include a resonator that causes camera 103 to momentarily vibrate in response to recognizing a particular hand gesture before acting on an operation associated with the particular hand gesture. However, camera 103 is not limited to a resonator and other haptic feedback systems are similarly contemplated. For example, camera 103 may be equipped with an electro-active polymer or shape-memory alloy or other material that contracts or expands in response to an electrical stimulus. In this manner, camera 103 may be made to squeeze the finger of user 101 to indicate that it has recognized a specific hand gesture.

Figure 4:
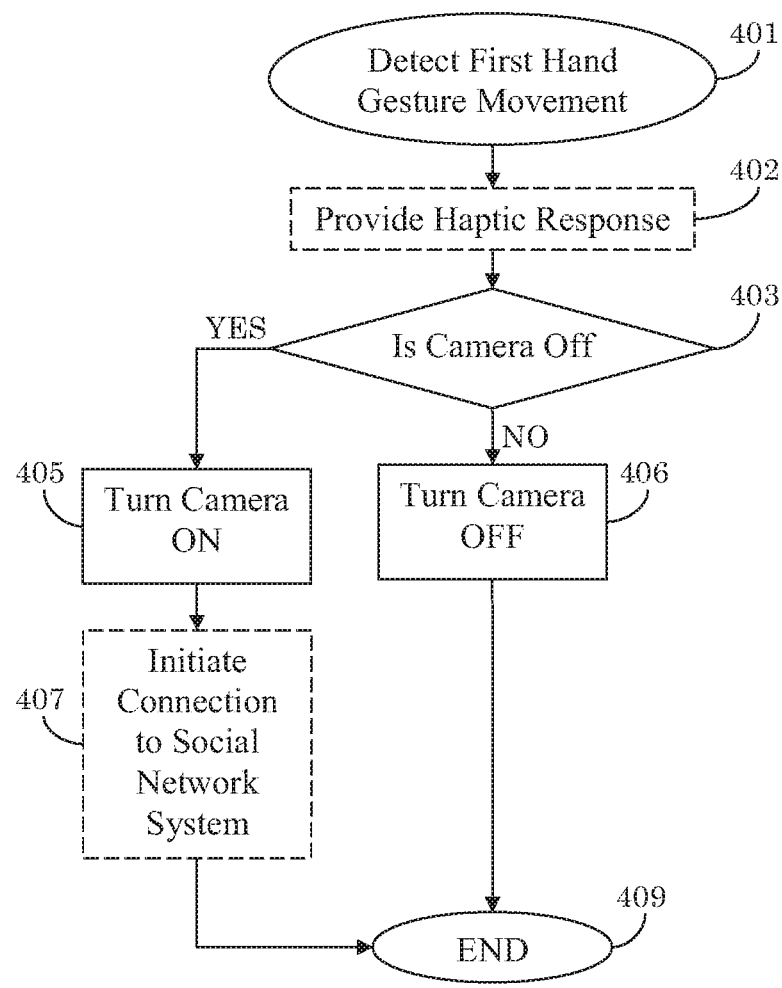
FIG. 4 illustrates an example response of a hand-worn camera to an example hand gesture.

FIG. 4 illustrates an example response of a camera 103 to an example hand gesture. At step 401, a first hand gesture is detected by camera 103 and camera 103 optionally responds by providing a haptic response at step 402 before checking whether camera 103 is in an off state. If no haptic feedback is provided, then camera 103 may proceed directly to step 403 from step 401. If camera 103 is currently not in an off state (step 403 returns NO), then camera 103 proceeds to step 406 and transitions to an off state. If camera 103 is currently in an off state (step 403 returns YES), then camera 103 proceeds to step 405 and transitions to an on state. The response sequence to the first hand gesture of step 401 may end at this point, as indicated by step 409, but camera 103 may optionally be configured to execute multiple operations in response to the single hand gesture of step 401. For example, after transitioning to the on state at step 405, camera 103 may execute any number of additional instructions before finishing its response to the first hand gesture of step 401. In the present example, camera 103 optionally initiates a connection to a social-networking system at step 407 before ending its response to the first hand gesture at step 409.

Figure 5:
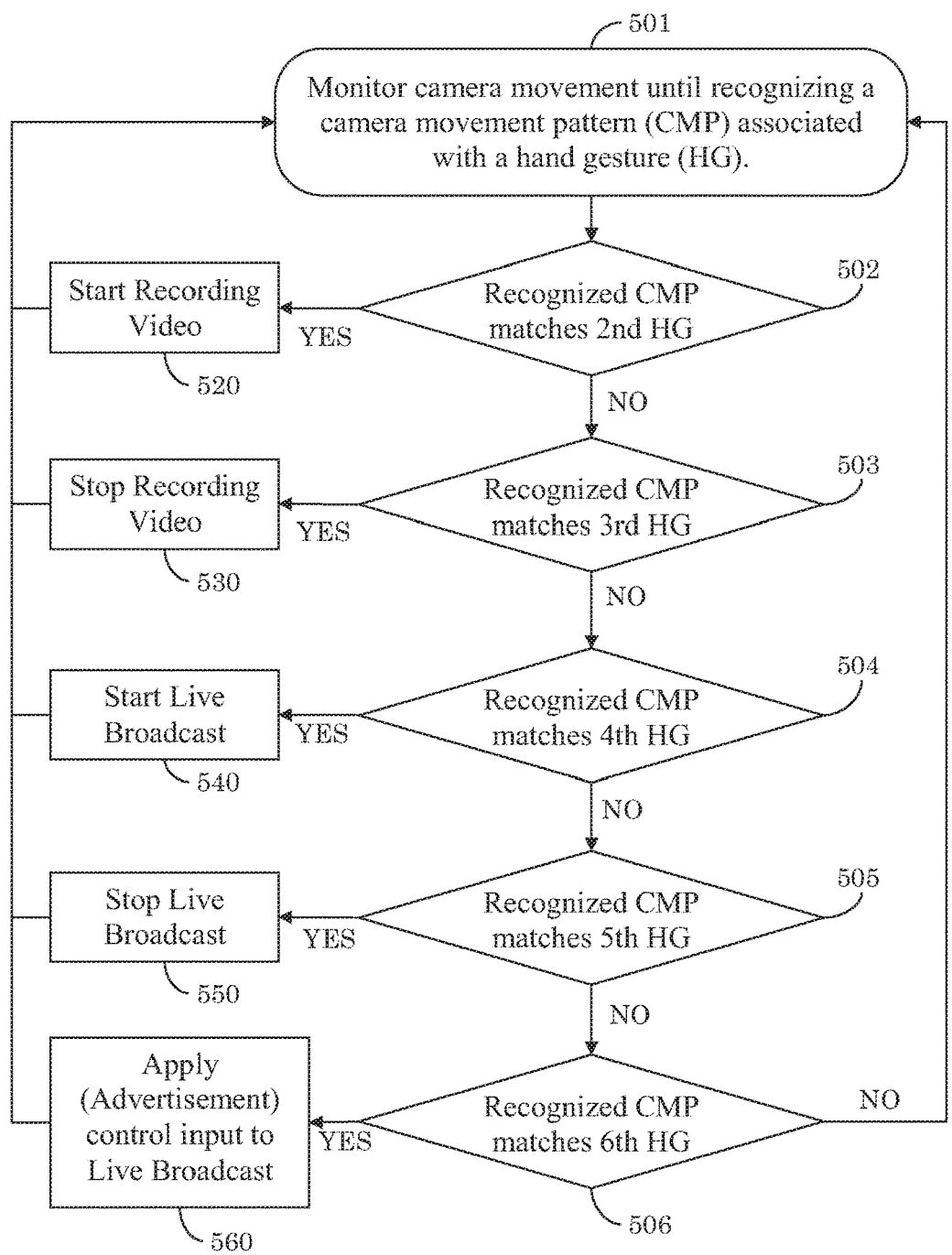
FIG. 5 illustrates another example response of a hand-worn camera to an example hand gesture.

FIG. 5 illustrates an example response of a camera 103 to an example hand gesture. Camera 103 may continuously monitor its movement (optionally including its orientation relative to a reference ground) looking for any camera movement that matches a camera movement pattern (CMP) associated with a predefined hand gesture (HG), as indicated by step 501. Upon recognizing a CMP associated with a predefined HG at step 501, camera 103 proceeds to determine which function is associated with the recognized CMP. Several approaches may be used to match a recognized CMP to its associated function, such as using a lookup table. In the present example, camera 103 proceeds through steps 502 to 506 comparing the recognized CMP with an example list of predefined HGs in sequence until a match is found. If a match is found, then camera 103 executes the function associated with the matched HG and returns to step 501 to monitor for another recognized CMP. If no match is found at step 506, then camera 103 may return to step 501 to monitor for another recognized camera movement pattern.

At step 502, if camera 103 determines that the recognized CMP matches a predefined second HG associated with a start video recording function (step 502 returns YES), then camera 103 proceeds to step 520 and starts recording video, if not already started. Camera 103 then returns to step 501 to monitor for another predefined hand gesture. At step 503, if camera 103 determines that the recognized CMP matches a predefined third HG associated with a stop video recording function (step 503 returns YES), then camera 103 proceeds to step 530 and stops recording video, if not already stopped. Camera 103 then returns to step 501 to monitor for another predefined hand gesture. At step 504, if camera 103 determines that the recognized CMP matches a predefined fourth HG associated with a start live broadcast function (step 504 returns YES), then camera 103 proceeds to step 540 and starts a live broadcast to select users, if not already started. The live broadcast may be from camera 103, or camera 103 may transmit a command to a network system (such as a social-networking system) to initiate the broadcast from the social-networking system. Camera 103 then returns to step 501 to monitor for another predefined hand gesture.

At step 505, if camera 103 determines that the recognized CMP matches a predefined fifth HG associated with a stop live broadcast function (step 505 returns YES), then camera 103 proceeds to step 550 and stops the live broadcast, if not already stopped. Camera 103 then returns to step 501 to watch for another predefined hand gesture. At step 506, if camera 103 determines that the recognized CMP matches a predefined sixth HG associated with a predefined control input (step 506 returns YES), then camera 103 may proceed to step 560 and execute the predefined control input. In the present example, the predefined control input may be an operational control input of a live broadcast. This control input may, for example, affect the presenting of advertisements in the live broadcast, such as starting or stopping a displaying of advertisements, selecting a type of advertisement, skipping from one advertisement to another, submitting a "like" or "dislike" input, etc. Although particular gestures controlling particular functions or sequences of functions of a particular camera are described and illustrated, this disclosure contemplates any suitable gestures controlling any suitable functions or sequences of functions of any suitable cameras. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sharing video content from a hand-worn camera across a social network environment including the particular steps of the method of FIG. 5, this disclosure contemplates any suitable method for sharing video content from a hand-worn camera across a social network environment including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
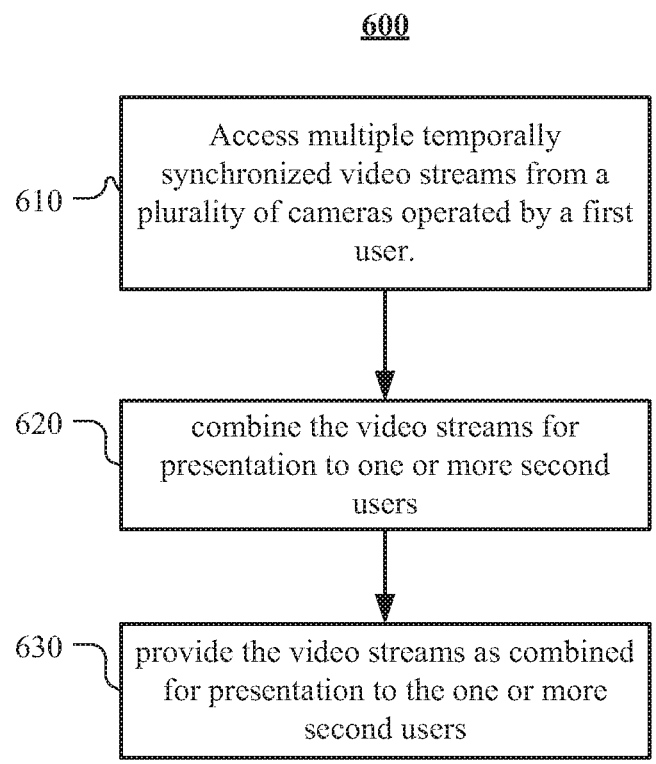
FIG. 6 illustrates an example method for sharing video content from an example hand-worn camera in an example social-network environment.

FIG. 6 illustrates an example method 600 for sharing video content from a hand-worn camera in a social-network environment. The method may begin at step 610, where multiple temporally synchronized video streams from multiple cameras operated by a user are accessed by a computing device, which may be part of a social-networking system. As explained above, at least one of the cameras is a wireless camera worn on the user's hand. At step 620, the accessed video streams are stitched together for presentation to one or more other users. At step 630, the video streams, as stitched together for presentation, are provided to the other users. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for sharing video content from a hand-worn camera across a social network environment including the particular steps of the method of FIG. 6, this disclosure contemplates any suitable method for sharing video content from a hand-worn camera across a social network environment including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
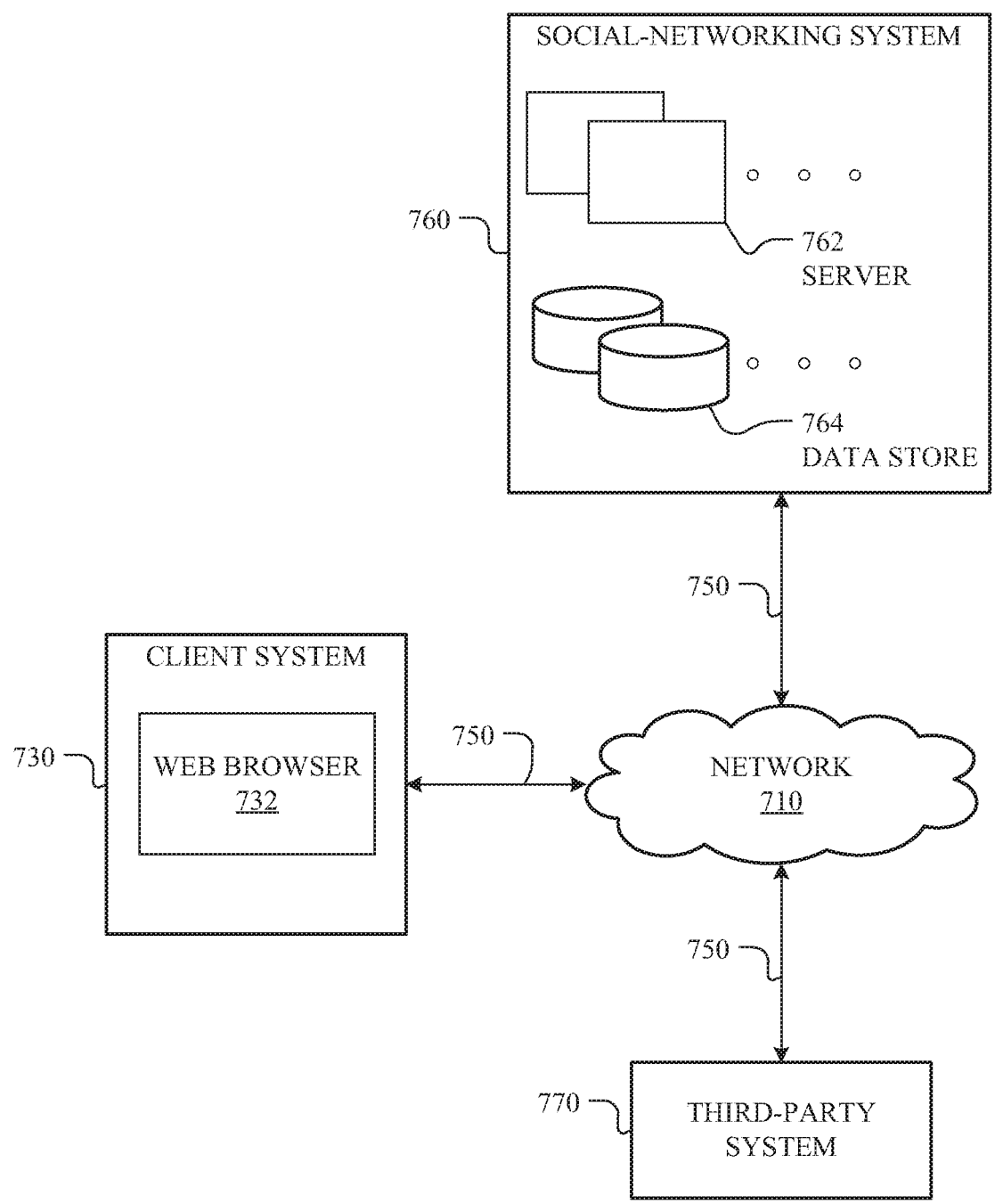
FIG. 7 illustrates an example network environment associated with an example social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
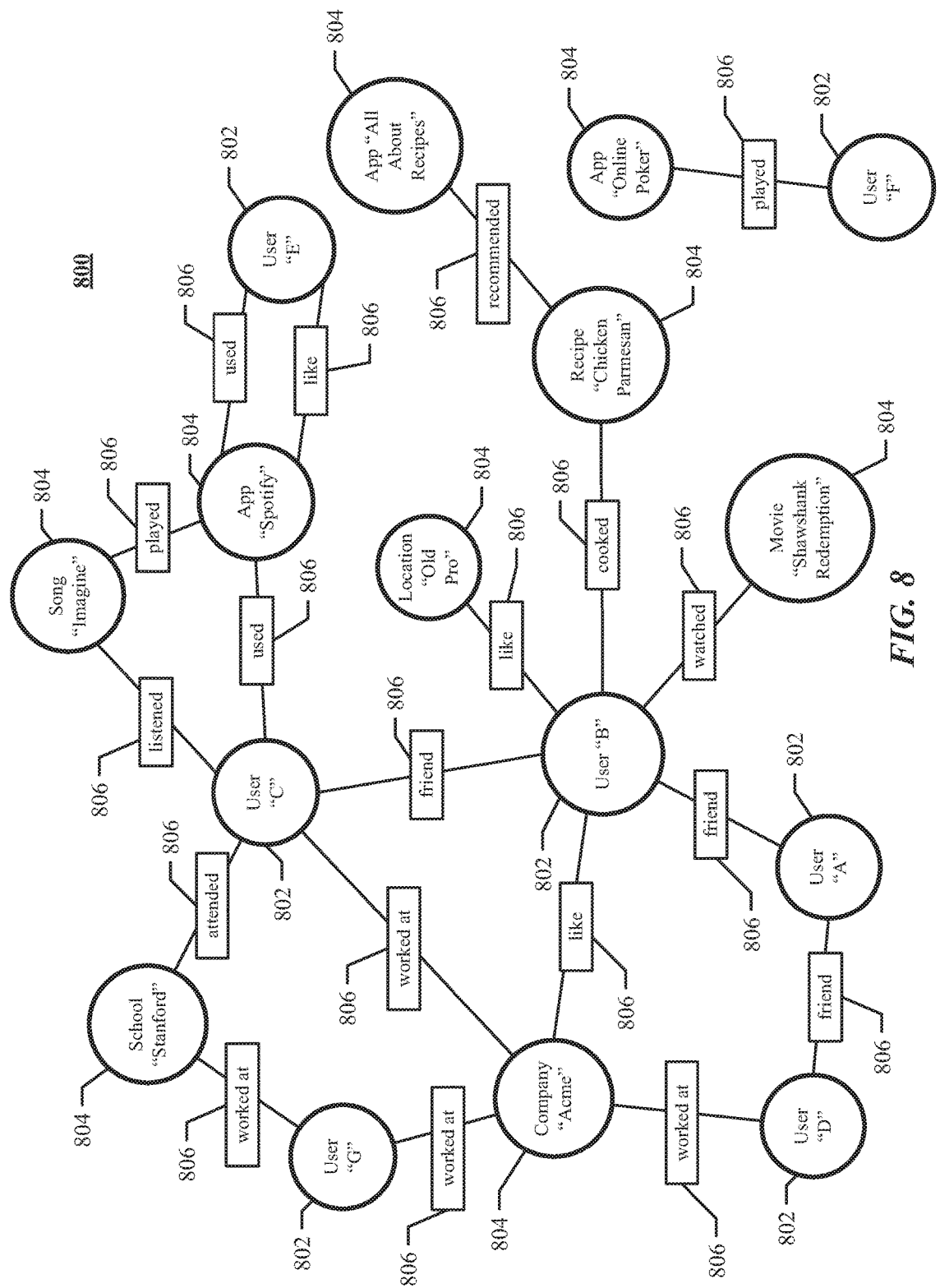
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party system 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 730 to send to social-networking system 760 a message indicating the user's action. In response to the message, social-networking system 760 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 760). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 760 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 760) or RSVP (e.g., through social-networking system 760) to an event associated with the advertisement. In addition or as an alternative, an advertisement may include social-networking-system content directed to the user. As an example and not by way of limitation, an advertisement may display information about a friend of the user within social-networking system 760 who has taken an action associated with the subject matter of the advertisement.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object (e.g. the above-described multiple temporally synchronized video streams or above-described video streams as stitched together for presentation to one or more second users) may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums (which may include videos) associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, social-networking system 760 may send a request to the data store 764 for the object. The request may identify the user associated with the request and may only be sent to the user (or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
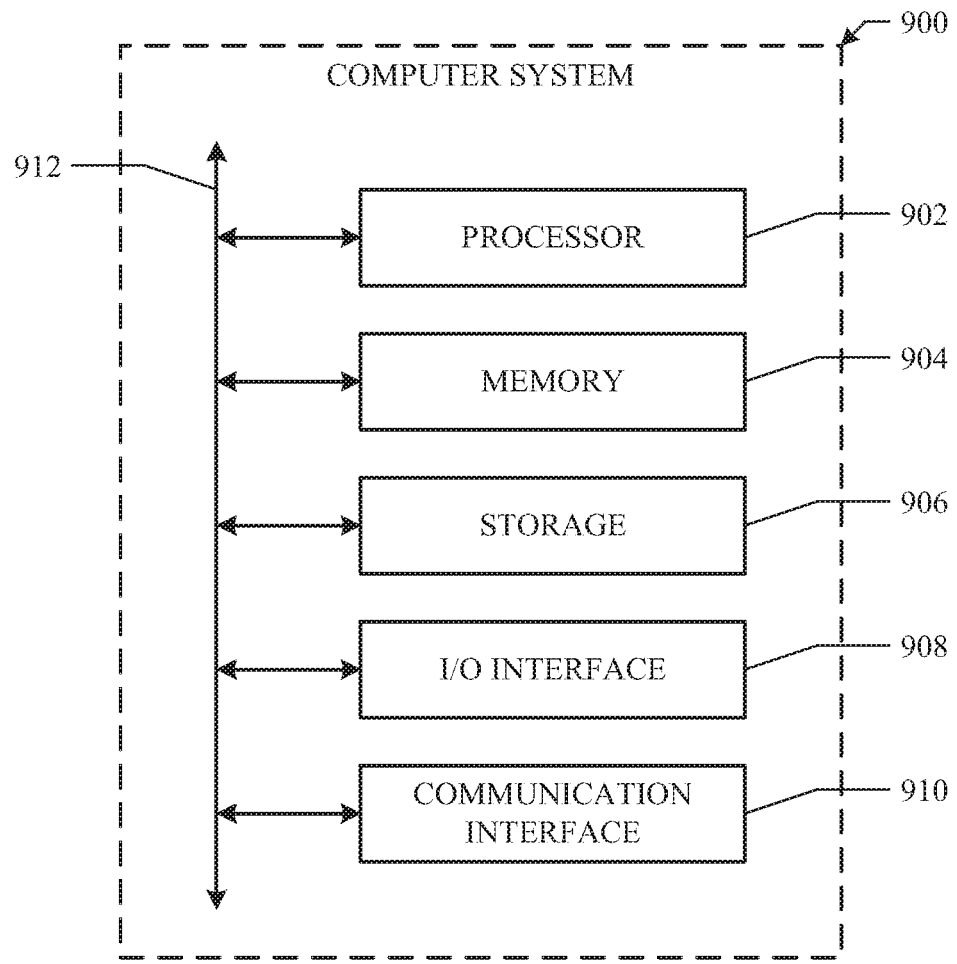
FIG. 9 illustrates an example computer system.

FIG. 9 illustrates an example computer system (or computing device) 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by one or more computing devices of an online social network:
   receiving, from a client device of a first user of the online social network, an indication of a hand gesture input requesting to initiate a connection to the online social network, wherein the client device is associated with a plurality of cameras operated by the first user, wherein at least one of the cameras is a wireless camera worn on the first user's hand;
   accessing, responsive to the received request to initiate the connection to the online social network, a plurality of temporally synchronized video streams, from the plurality of cameras, wherein each camera has a different field-of-view;
   stitching together the video streams for presentation to one or more second users, wherein the stitched-together video streams comprise a split-screen view that simultaneously presents at least two of the video streams from two different fields-of-view; and
   providing, to one or more client systems of one or more second users of the online social network, respectively, the video streams as stitched together for presentation to the respective users, wherein each second user is connected to the first user on the online social network.

2. The method of claim 1, wherein the wireless camera worn on the first user's hand is worn on a fingertip of the first user's hand or as a ring on the first user's hand.

3. The method of claim 1, wherein at least one of the cameras is a wireless camera worn on the first user's other hand.

4. The method of claim 1, wherein at least one of the wireless cameras worn on the first user's hand is worn on the first user's thumb.

5. The method of claim 1, wherein a mobile phone of the first user comprises at least one of the cameras.

6. The method of claim 1, wherein:
   the first and second users are members of an online social network;
   the first user is connected to the second users within the online social network; and
   the video streams as stitched together are provided for presentation to the second users through the online social network.

7. The method of claim 1, wherein two or more of the cameras are operable to be aimed in different directions while recording.

8. The method of claim 1, wherein the wireless camera worn on the first user's hand is operable to be controlled by one or more pre-determined hand gestures of the first user.

9. The method of claim 8, wherein the pre-determined hand gestures comprise one or more of:
   a first one of the hand gestures comprising a first pre-determined movement of the hand the wireless camera is worn on that turns on at least the wireless camera;
   a second one of the hand gestures comprising a second pre-determined movement of the hand the wireless camera is worn on that turns off at least the wireless camera;
   a third one of the hand gestures comprising a third pre-determined movement of the hand the wireless camera is worn on that causes at least the wireless camera to start recording;
   a fourth one of the hand gestures comprising a fourth pre-determined movement of the hand the wireless camera is worn on that causes at least the wireless camera to stop recording;
   a fifth one of the hand gestures comprising a fifth pre-determined movement of the hand the wireless camera is worn on that causes a live broadcast of video recorded by at least the wireless camera through an online social network to begin;
   a sixth one of the hand gestures comprising a sixth pre-determined movement of the hand the wireless camera is worn on that causes an advertisement to be presented in the live broadcast;

a seventh one of the hand gestures comprising a seventh pre-determined movement of the hand the wireless camera is worn on that causes the live broadcast to stop; or an eighth one of the hand gestures comprising an eighth pre-determined movement of the hand the wireless camera is worn on that causes video recorded by at least the wireless camera to be uploaded to the online social network.

10. The method of claim 8, wherein the wireless camera worn on the first user's hand is operable to provide haptic feedback to the first user in response to an accepted control input by a hand gesture of the first user.

11. The method of claim 1, wherein each camera of the plurality of cameras is configured to have an internal clock or counter, wherein each video stream of the plurality of video streams is associated with one or more timestamps, and wherein the plurality of video streams is temporally synchronized based on the respective timestamps associated with each video stream.

12. The method of claim 1, wherein the video streams as stitched together are provided for presentation to the one or more client systems of the one or more second users as a real-time stream.

13. The method of claim 1, further comprising:
accessing a social graph comprising a plurality of nodes and a plurality of edges connecting the nodes, wherein the plurality of nodes comprises:
a first node corresponding to the first user, and
one or more second nodes corresponding to the one or more second users, respectively, each second node being connected to the first node by an edge.

14. A system comprising: one or more processors; and one or more computer-readable non-transitory storage media coupled to one or more of the processors and comprising instructions operable when executed by one or more of the processors to cause the system to:
receive, from a client device of a first user of an online social network, an indication of a hand gesture input requesting to initiate a connection to the online social network, wherein the client device is associated with a plurality of cameras operated by the first user, wherein at least one of the cameras is a wireless camera worn on the first user's hand;
access, responsive to the received request to initiate the connection to the online social network, a plurality of temporally synchronized video streams, from a plurality of cameras, wherein each camera has a different field-of-view;
stitch together the video streams for presentation to one or more second users, wherein the stitched-together video streams comprise a split-screen view that simultaneously presents at least two of the video streams from two different fields-of-view; and
provide, to one or more client systems of one or more second users of the online social network, respectively, the video streams as stitched together for presentation to the respective users, wherein each second user is connected to the first user on the online social network.

15. The system of claim 14, wherein the wireless camera worn on the first user's hand is worn on a fingertip of the first user's hand or as a ring on the first user's hand.

16. The system of claim 14, wherein at least one of the cameras is a wireless camera worn on the first user's other hand.

17. The system of claim 14, wherein at least one of the wireless cameras worn on the first user's hand is worn on the first user's thumb.

18. The system of claim 14, wherein a mobile phone of the first user comprises at least one of the cameras.

19. The system of claim 14, wherein:
the first and second users are members of an online social network;
the first user is connected to the second users within the online social network; and
the video streams as stitched together for are provided for presentation to the second users through the online social network.

20. The system of claim 14, wherein two or more of the cameras are operable to be aimed in different directions while recording.

21. The system of claim 14, wherein the wireless camera worn on the first user's hand is operable to be controlled by one or more pre-determined hand gestures of the first user.

22. The system of claim 21, wherein the pre-determined hand gestures comprise one or more of:
a first one of the hand gestures comprising a first pre-determined movement of the hand the wireless camera is worn on that turns on at least the wireless camera;
a second one of the hand gestures comprising a second pre-determined movement of the hand the wireless camera is worn on that turns off at least the wireless camera;
a third one of the hand gestures comprising a third pre-determined movement of the hand the wireless camera is worn on that causes at least the wireless camera to start recording;
a fourth one of the hand gestures comprising a fourth pre-determined movement of the hand the wireless camera is worn on that causes at least the wireless camera to stop recording;
a fifth one of the hand gestures comprising a fifth pre-determined movement of the hand the wireless camera is worn on that causes a live broadcast of video recorded by at least the wireless camera through an online social network to begin;
a sixth one of the hand gestures comprising a sixth pre-determined movement of the hand the wireless camera is worn on that causes an advertisement to be presented in the live broadcast;
a seventh one of the hand gestures comprising a seventh pre-determined movement of the hand the wireless camera is worn on that causes the live broadcast to stop; or
an eighth one of the hand gestures comprising an eighth pre-determined movement of the hand the wireless camera is worn on that causes video recorded by at least the wireless camera to be uploaded to the online social network.

23. The system of claim 21, wherein the wireless camera worn on the first user's hand is operable to provide haptic feedback to the first user in response to an accepted control input by a hand gesture of the first user.

* * * * *